E. G. Alwood.

Hoop Skirt.

No. 785 Reissued Jul. 26, 1859.

UNITED STATES PATENT OFFICE.

E. G. ATWOOD, OF DERBY, ASSIGNOR TO THE SHELTON & OSBORN SKIRT MANUFACTURING COMPANY, OF BIRMINGHAM, CONNECTICUT.

IMPROVEMENT IN SKELETON SKIRTS.

Specification forming part of Letters Patent No. 21,806, dated October 19, 1858; Reissue No. 785, dated July 26, 1859.

DIVISION B.

*To all whom it may concern:*

Be it known that I, E. G. ATWOOD, of Derby, in the county of New Haven and State of Connecticut, have invented certain new and useful Improvements in Skeleton Skirts, of which the following is a full, clear, and exact description, reference being had to the accompanying drawings, forming part of this specification, in which—

Figure 1:
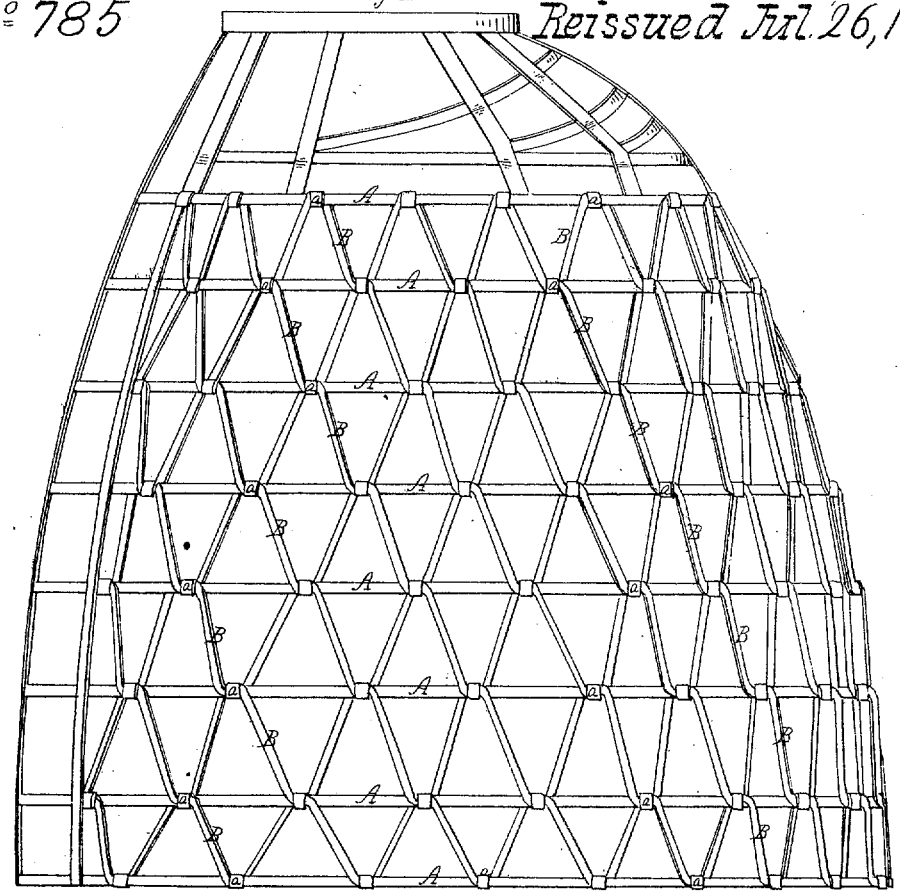
Figure 2:
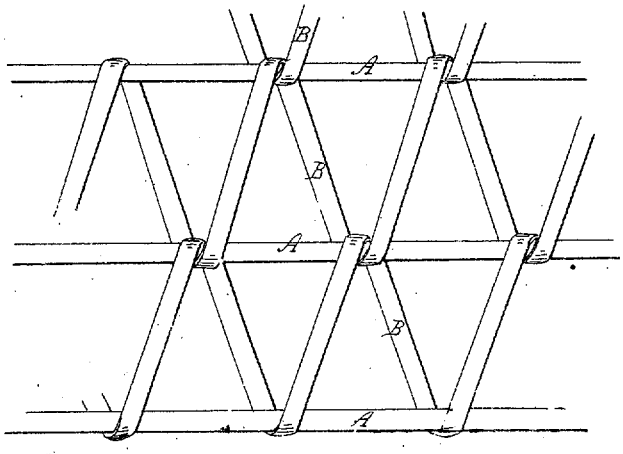

Figure 1 represents a side view of a skirt constructed according my improvements. Fig. 2 represents a view of a portion of the skirt, on an enlarged scale, showing the manner of connecting and suspending the hoops.

The object of improvements in hoop-skirts is to connect the hoops, by means of tapes or equivalent material, in such manner that they will be uniformly and regularly braced and tied in opposite directions, in order to avoid swinging or lateral vibrations, and supported in such manner that they will be less liable to sag, to displacement, or to acquire a permanent distortion. To accomplish this object many different modes of connecting the hoops to form the skirt have been devised, and among others the application of a foundation of knit or net material, through the meshes of which, at convenient distances apart, the hoops are interlaced and rest loosely in the mesh at the interlocking of the threads and without being confined by the interlooping of the meshes. The thread or cords forming the meshes run in an oblique direction to the hoops and interlock or interloop between the hoops, as well as at points of passing the hoops. This description of fabric does not support the hoops regularly and uniformly throughout, as the interlooping of the threads is not at regular and uniform distances apart or parallel to each other or to the hoops; hence the hoops, instead of being sustained at all their points of intersection with the threads, rest only on the short loops. Thus the short loops bear all the weight of the hoops, and the strain thrown upon them causes them to break or wear through rapidly; or, if they are sufficiently strong to sustain the hoops and the weight they bear, the hoops become permanently distorted, and the symmetry of the skirt is destroyed. The diagonal threads or cords passing from one hoop to the other in opposite directions form a system of ties acting in opposite directions to prevent the hoops swinging; but as this system of ties are unequal in length in knit or net fabrics, and also interloop or interlock not only at their crossing at the hoops, but between the hoops, the strain, instead of being transferred from one hoop to the other in the direction of the diagonal cords, is, in the short cords, only transferred to its intersection between the hoops with the next cord inclined in the opposite direction, and by that transferred to the hoop above; hence the two cords, instead of straining in opposite directions, as they should, and counterbalance each other, strain in the same direction. The effect of this unequal straining is to throw the hoops to that side of the skirt on which the short cords preponderate, and also to cause the skirt to sway or swing more more easily in that direction than in the other; hence this diagonal arrangement of the cords, when they interloop between the hoops, is of little effect to prevent the swinging of the hoops.

My invention consists in disposing the tapes or equivalent material in opposite diagonal directions across the hoops, without being connected between the hoops, but connected to the hoops at suitable intervals by means of clasps, sewing, or tying, or any of the well-known means.

A A are a series of elastic hoops which extend around the skirt, and are of the kind commonly used. D D are a series of elastic ribs forming the bustle. C C are straps which connect the bustle-ribs with each other and with the hoops and waistband. B B are straps or tapes which connect the hoops of the skirt. *a a* are clasps by which the tapes are confined to the hoops.

The straps connecting the hoops pass in opposite diagonal directions across the hoops and form a continuous system of diagonal ties inclining in opposite directions, or lattice-work, extending from the upper to the lower hoop of the skirt, which only interloop or connect at their crossing of the several hoops, to which they are confined by clasps or ties, or by any well-known means.

The straps connecting each pair of hoops are continuous and pass from one hoop to the other in opposite diagonal directions, and form a continuous series of connected loops of uniform length, equally strained, so that the hoops are supported at equal distances apart throughout their entire lengths, and bear uniformly on all the loops. As the loops are of uniform length and only interloop or connect at the point of crossing the several hoops, it will be seen that they act as equal ties in opposite directions, and the strain is transferred from one diagonal through the hoop to the next diagonal inclining in the opposite direction around the hoops, so that the adjacent diagonal tapes strain equally in opposite directions, counterbalance each other, retain the skirt from swaying more in one direction than in another, and prevent the skirt in a great degree from being permanently distorted, so that it is more durable and retains its original symmetry and form.

Having thus described my improvements in skeleton skirts, what I claim therein as new, and desire to secure by Letters Patent of the United States, is—

A skirt formed of elastic hoops and tape or equivalent material disposed across the hoops in opposite diagonal directions without being connected between the hoops, but connected to the hoops at suitable intervals, substantially as described.

In testimony whereof I have hereunto subscribed my name.

E. G. ATWOOD.

Witnesses:
LUCIUS GILBERT,
F. L. FAULKNER.